United States Patent [19]

Zabler et al.

[11] Patent Number: 5,703,293
[45] Date of Patent: Dec. 30, 1997

[54] ROTATIONAL RATE SENSOR WITH TWO ACCELERATION SENSORS

[75] Inventors: Erich Zabler, Stutensee; Joerg Wolf, Karlsruhe; Markus Lutz, Reutlingen, all of Germany

[73] Assignee: Robert Bosch GmbH, Stuttgart, Germany

[21] Appl. No.: 645,375

[22] Filed: May 13, 1996

[30] Foreign Application Priority Data

May 27, 1995 [DE] Germany ............... 195 19 488.8

[51] Int. Cl.[6] .................. G01P 9/00; G01C 19/00
[52] U.S. Cl. .................. 73/504.02; 73/510; 73/504.12
[58] Field of Search .................. 73/504.02, 504.03, 73/570, 571, 572, 574.32, 504.12

[56] References Cited

U.S. PATENT DOCUMENTS

| | | | |
|---|---|---|---|
| 4,512,192 | 4/1985 | Peters | 73/510 |
| 5,339,690 | 8/1994 | Bar-Avi | 73/511 |
| 5,490,420 | 2/1996 | Burdess | 73/504.02 |
| 5,495,761 | 3/1996 | Diem et al. | 73/514.32 |
| 5,559,291 | 9/1996 | Hasegawa | 73/504.02 |
| 5,569,852 | 10/1996 | Marek et al. | 73/514.32 |

FOREIGN PATENT DOCUMENTS 40 32 559   4/1992   Germany.

Primary Examiner—Hezrone E. Williams
Assistant Examiner—Helen C. Kwok
Attorney, Agent, or Firm—Kenyon & Kenyon

[57] ABSTRACT

A rotational sensor has a vibrating weight with two acceleration sensors mounted on it. The two acceleration sensors are designed to detect forces acting at a right angle to each other. The vibrating weight is set in vibration by means of driving devices, and rotation of the rotational sensor about two axes of rotation that are normal to each other is detected with the help of the acceleration sensors. The Coriolis forces in a plane are determined in this way.

7 Claims, 1 Drawing Sheet 5,703,293

ROTATIONAL RATE SENSOR WITH TWO ACCELERATION SENSORS

BACKGROUND INFORMATION

German Patent Application No. 40 32 559 describes a rotational rate sensor with a vibrating weight that is excited to vibration by means of excitation devices, where a deflectable weight is provided on the vibrating weight. When the vibrating weight is set in vibration and the rotational rate sensor is rotated, a Coriolis force acts on the deflectable weight, thus causing it to move. This movement of the deflectable weight is detected by analyzer units and used to determine the Coriolis force and thus the rotation. With the rotational rate sensor described, only the rotation of the rotational rate sensor about a single axis of rotation can be measured, but it would be advantageous to be able to measure the rotation about both the longitudinal and vertical axes in the case of an automobile, for example, in order to accurately estimate the driving situation.

SUMMARY OF THE INVENTION

The rotational rate sensor according to the present invention has the advantage that rotation about two axes can be measured. This makes it possible to manufacture a rotational rate sensor in smaller sizes and less expensively for measuring the rotation about two axes.

It is especially advantageous to provide at least two rotational rate sensors on a common substrate, where the rotational rate sensors measure the Coriolis forces in at least three directions that are each normal to the others. This makes it possible to determine the Coriolis force in each direction by using a unit with a compact design.

In addition, it is also advantageous to provide two rotational rate sensors of a similar design and to induce them to vibrate in phase opposition in order to thereby obtain a signal that is independent of external interfering linear acceleration by subtracting the signals supplied by the rotational rate sensors, where the resulting signal is proportional to the Coriolis forces to a high degree.

It is especially advantageous to design the suspension for the weights in such a way that deflection in the direction of vibration of the vibrating weights is suppressed. Thus, this rotational rate sensor is insensitive to interference caused by the vibration of the vibrating weight, and the measurement signal is not distorted by the vibration of the rotational rate sensors.

A preferred embodiment of this rotational rate sensor relates to an arrangement of a first weight in the form of a silicon wafer suspended on bars. The silicon wafer is arranged on the vibrating weight so it is parallel to the direction of vibration of the vibrating weight. This permits a good method of detecting a Coriolis force acting at a right angle to the direction of vibration of the vibrating weight.

It is also advantageous to provide a second deflectable weight having a comb-like structure that engages with another comb-like structure, where the two comb-like structures form capacitor surfaces. The second deflectable weight is arranged so it can be deflected in the plane of vibration of the vibrating weight. This permits accurate detection of the Coriolis force acting at a right angle to the direction of vibration of the vibrating weight.

BRIEF DESCRIPTION THE DRAWINGS

DETAIL DESCRIPTION

Figure 1:
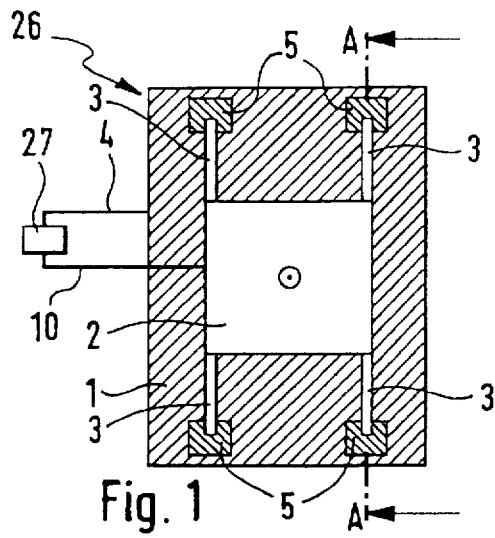
FIG. 1 shows a first deflectable weight according to the present invention.
Figure 2:
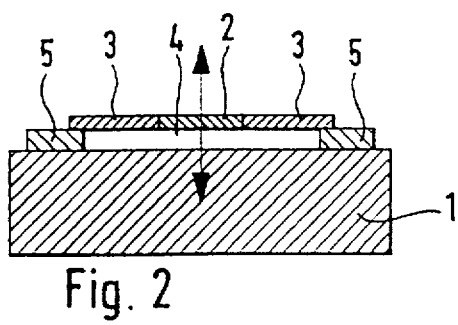
FIG. 2 shows a cross section of the first deflectable weight according to the present invention.

FIG. 1 shows an acceleration sensor 26 having a silicon substrate 1 on which are mounted four terminals 5. Terminals 5 are arranged to form the corners of a rectangle. A first weight 2 formed by a square silicon wafer is provided between the four terminals 5. The first weight 2 has a bar 3 at each corner. Each bar 3 leads to the terminal 5 that is closest to bar 3. Bars 3 are also made of silicon. The first weight 2 is mounted so it can be deflected in the direction normal to silicon substrate 1 by means of bars 3 over silicon substrate 1 (FIG. 2). Bars 3 are designed so the first weight 2 can be deflected only at a right angle to substrate 1. For example, this is accomplished by designing bars 3 to be especially wide in the plane parallel to the silicon wafer. A first conductor 4 leads from silicon substrate 1 to a first analyzer circuit 27. A second conductor 10 leads from the first weight 2 to a second input of the first analyzer circuit 27.

FIG. 2 shows the arrangement from FIG. 1 along section A—A. Silicon substrate 1 is shown as a square block on which there are two terminals 5. The first weight 2 is positioned between terminals 5 and is connected to each terminal 5 by bars 3. The deflection of the first weight 2 induced by the Coriolis force is indicated schematically with an arrow in FIG. 2.

The arrangement according to FIGS. 1 and 2 functions as follows:

When the rotational rate sensor is rotated and thus the first weight 2 is deflected at a right angle to silicon substrate 1 by the Coriolis force, analyzer circuit 27 detects this deflection by means of a capacitive measurement, for example, if the respective surfaces of the first weight 2 and of substrate 1 are designed as electrodes. The deflection is proportional to the rotation about a given axis of rotation, so the rotational speed can be calculated.

Figure 3:
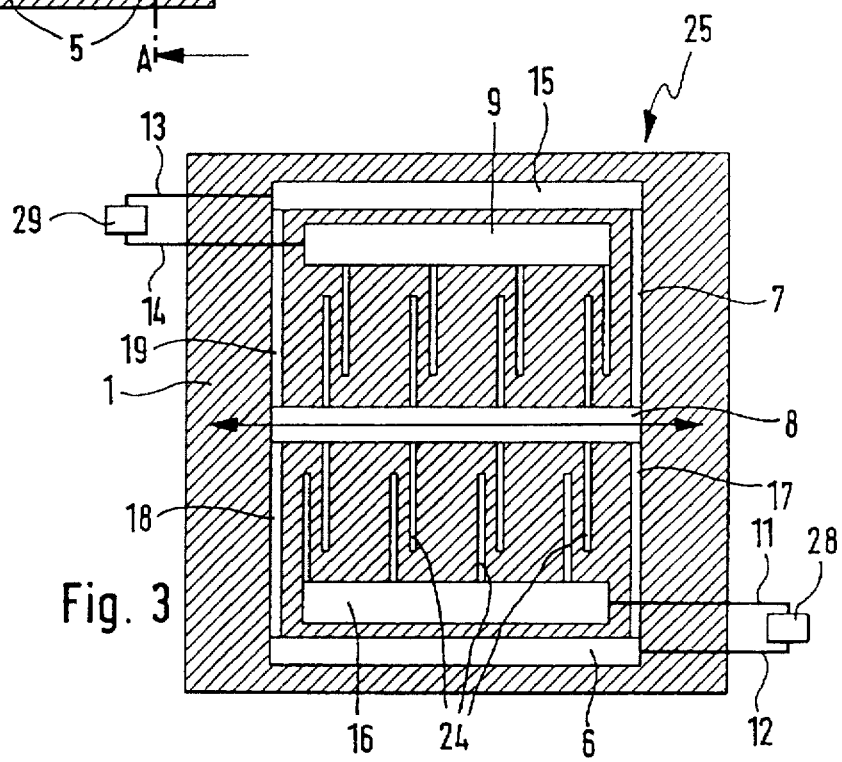
FIG. 3 shows a second deflectable weight with a comb structure according to the present invention.

FIG. 3 shows an acceleration sensor 25 that can be deflected in the plane of the rotational rate sensor and consists of a silicon substrate 1 on which there are two elongated rectangular fastener pans 6, 15 aligned parallel to each other with a fixed distance between them. A fastener bar 7, 17, 18, 19 is mounted at each end of fastener parts 6, 15 and is guided in the direction of the other fastener pans 15, 6, respectively, and is attached to a second weight 8 in the middle between the two fastener pans. The second weight 8 is also designed as an elongated rectangular shape.

The second weight 8 can be deflected by the four fastener bars 7, 17, 18, 19 and is held suspended over silicon substrate 1. Fastener bars 7, 17, 18, 19 are designed so that second weight 8 can move only at a right angle to the orientation of fastener bars 7, 17, 18, 19. This is achieved, for example, by the fact that fastener bars 7, 17, 18, 19 have a great height in comparison with their width, so that fastener bars 7, 17, 18, 19 can be bent only laterally but not in height.

The second weight 8 can thus be deflected only parallel to the alignment of fastener parts 6, 15. The second weight 8 has four bars 24 running at a right angle to the second weight 8 in the direction of the first fastener part 6 and four more bars 24 running in the direction of the second fastener part 15, where these bars 24 are guided in the direction of the first and second fastener parts 6, 15, respectively. Bars 24 are arranged parallel to each other with a fixed distance between them in the manner of a comb. A second fastener bar 16 is mounted on silicon substrate 1 between the first fastener part 6 and rods 24. The second fastener bar 16 is parallel to the first fastener part 6 and has an elongated rectangular shape. The second fastener bar 16 is approximately as long as the first fastener part 6 and is bordered in the longitudinal direction by bending bars 17, 18 of the first fastener part 6. The second fastener bar 16 also has rods 24 that are guided in the direction of the second weight 8. Rods 24 of the second fastener part 6 and rods 24 of the second weight 8 that are arranged in the direction of the second fastener bar 16 form two intermeshing comb structures.

Likewise, a first fastener bar 9 with an elongated rectangular shape is provided between the second fastener part 15 and the second weight 8 and is aligned parallel to the second fastener part 15. The first fastener bar 9 has rods 24 that are aligned in the direction of the second weight 8 and are arranged with a fixed spacing between them. Rods 24 of the second weight 8 that are arranged in the direction of the first fastener bar 9 and the rods of the first fastener bar 9 that are arranged in the direction of the second weight 8 also form two intermeshing comb-like structures.

The first fastener bar 9 and the second fastener bar 16 are permanently mounted on silicon substrate 1. The first fastener part 6 is connected to a second analyzer circuit 28 by a fourth conductor 12. The second fastener bar 16 is connected to the second analyzer circuit 28 by a third conductor 11. The second fastener part 15 is connected to a third analyzer circuit 29 by a fifth conductor 13. Likewise, the first fastener bar 9 is also connected to the third analyzer circuit 29 by a sixth conductor 14.

The arrangement according to FIG. 3 functions as follows: When the second weight 8 is deflected by a Coriolis force acting on it, the distance between bars 24 of the second weight 8 changes relative to bars 24 of the first fastener bar 9 and to bars 24 of the second fastener bar 16. This change in spacing is determined by the second analyzer circuit 28 and the third analyzer circuit 29 in the form of a capacitive measurement.

Figure 4:
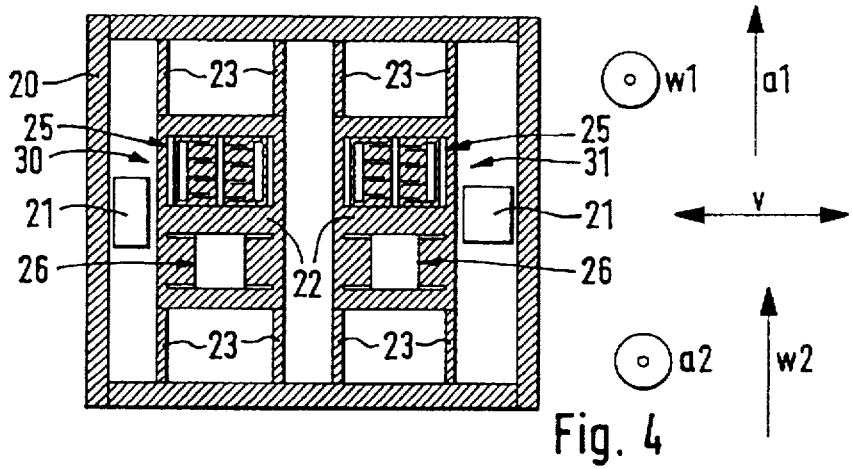
FIG. 4 shows two rotational rate sensors according to the present invention.

FIG. 4 shows two rotational rate sensors 30, 31, each of which includes a silicon substrate 1 with an elongated rectangular shape. The corners of silicon substrate 1 are each connected to a frame 20 by a vibrating bar 23. Frame 20 is designed as the substrate for the rotational rate sensor(s). An acceleration sensor is mounted on silicon substrate 1 of rotational rate sensors 30, 31 as indicated in FIGS. 1 and 3. The first, second and third analyzer circuits 27, 28, 29 belonging to acceleration sensors 30, 31 according to FIGS. 1 and 3 were not included in FIG. 4 for the sake of simplicity.

Frame 20 is also made of silicon. Instead of frame 20, a silicon wafer can also be provided. The first and second rotational rate sensors 30, 31 are mounted so they can be deflected over vibrating bars 23. FIG. 4 schematically shows drive units 21 that cause the first and second rotational rate sensors 30, 31 to vibrate.

Rotational rate sensors 30, 31 are arranged parallel to each other. The direction of vibration of vibrating weights 22 and rotational rate sensors 30, 31 is normal to the longitudinal extent of silicon substrates 1. The direction of vibration is indicated in the form of an arrow labeled with the letter v next to FIG. 4. Planar acceleration sensors 25 are arranged on rotational rate sensors 30, 31 in such a way that the deflection due to the Coriolis force is normal to silicon substrate 1. The direction of deflection of planar acceleration sensors 25 is indicated with an arrow a 1. The axis of rotation of the rotational rate sensor belonging to the direction a 1 of the Coriolis force is indicated as w1 and is shown in FIG. 4.

Acceleration sensors 26 designed as wafers measure the Coriolis force in the direction normal to silicon substrate 1. The resulting direction is marked with an arrow labeled as a2. The direction a2 of the Coriolis force corresponds to one axis of rotation of the rotational rate sensor, which is also indicated with an arrow w2.

The arrangement according to FIG. 4 functions as follows: Vibration according to the direction v illustrated here is induced in the vibrating weights of the first and second rotational rate sensors 30, 31 with the help of driving devices 21. When the entire arrangement with frame 20 is rotated about a first axis of rotation w1, the second weights 8 of planar acceleration sensors 25 are deflected in direction a1 and, from this deflection, the second and third analyzer circuits 28, 29 determine the corresponding Coriolis force in direction a1.

When frame 20 with rotational rate sensors 30, 31 is rotated about the second axis of rotation w2, the first weights 2 of perpendicular acceleration sensors 26 are deflected in the direction of vibrating weights 22. This deflection is measured with the help of the first analyzer circuits 27 and the result is used to calculate the Coriolis force acting in direction a2. This yields the Coriolis forces acting in the plane extending from the first direction a1 and the second direction a2.

Driving devices 21 can operate according to the electromagnetic or thermomechanical method of excitation or some other method of actuation. The structures illustrated here are preferably made of a monocrystalline silicon wafer by surface micromechanics and bulk micromechanics using known methods such as dry or wet chemical etching. In addition, anisotropic electrochemical etching with KOH or dry chemical etching can also be used. The first, second and third analyzer circuits 27, 28, 29 can also be integrated into the silicon wafer.

Rotational sensors 30, 31 can also be excited to vibrate in phase opposition by driving devices 21. When rotational rate sensors 30, 31 vibrate in phase opposition, the signals detected by planar acceleration sensors 25 and the signals detected by the perpendicular acceleration sensors are subtracted from each other. Determining the difference makes it possible to compensate for the transverse acceleration of planar acceleration sensors 25 or perpendicular acceleration sensors 26 by inducing vibration.

For detection of a third axis of rotation, another rotational rate sensor with a similar design can also be provided, so the Coriolis force is generated in rotation about the third axis of rotation according to one of the principles illustrated in FIGS. 1 to 3. The acceleration sensors illustrated in the figures can of course also be replaced acceleration sensors designed according to different measurement principles. Rotational rate sensors 30, 31 illustrated in FIG. 4 can also be arranged in such a way that they vibrate at a right angle to each other. Accordingly, any combinations of rotational rate sensors that vibrate in parallel or normal to each other are also possible.

What is claimed is:

1. A rotational rate sensor comprising:
   at least one vibrating weight;

an excitation device for inducing vibration of the vibrating weight;

a first deflectable weight arranged on the vibrating weight;

a first analyzer device for determining a deflection of the first deflectable weight;

a second deflectable weight arranged on the vibrating weight; and a second analyzer device for determining a deflection of the second deflectable weight;

wherein directions of deflection of the first and second deflectable weights are not parallel to each other and are not parallel to a direction of vibration of the vibrating weight.

2. The sensor according to claim 1, wherein the sensor is at least partially composed of silicon.

3. The sensor according to claim 1, wherein the sensor is arranged on a common substrate with an additional rotational rate sensor, and the sensor vibrates in phase opposition with the additional rotational rate sensor.

4. The sensor according to claim 1, wherein the first and second deflectable weights have suspensions, the suspensions having a rigidity, with respect to deflection in the direction of vibration of the vibrating weight, greater than a threshold value.

5. The sensor according to claim 1, wherein the first deflectable weight is arranged as a silicon wafer deflectable at a right angle to the direction of vibration of the vibrating weight.

6. The sensor according to claim 1, wherein the second deflectable weight has a first comb structure deflectable relatively toward a second comb structure.

7. The sensor according to claim 1, wherein the sensor is arranged on a common substrate with at least one additional rotational rate sensor, a rotation of the substrate about three axes of rotation normal to each other being determined by a measured Coriolis force.

* * * * *

UNITED STATES PATENT AND TRADEMARK OFFICE
CERTIFICATE OF CORRECTION

PATENT NO. : 5,703,293
DATED : Dec. 30, 1997
INVENTOR(S) : Erich Zabler, et al

It is certified that error appears in the above-identified patent and that said Letters Patent is hereby corrected as shown below:

Item [57] Abstract, line 6, "by means of" should be --using--;

Column 2, lines 48, 51 and 53, "pans" should be --parts--; and

Column 4, lines 4 and 6, "a 1" should be --a1--.

Signed and Sealed this

Tenth Day of August, 1999

Attest:

Q. TODD DICKINSON

*Attesting Officer*  *Acting Commissioner of Patents and Trademarks*